Figure 1:
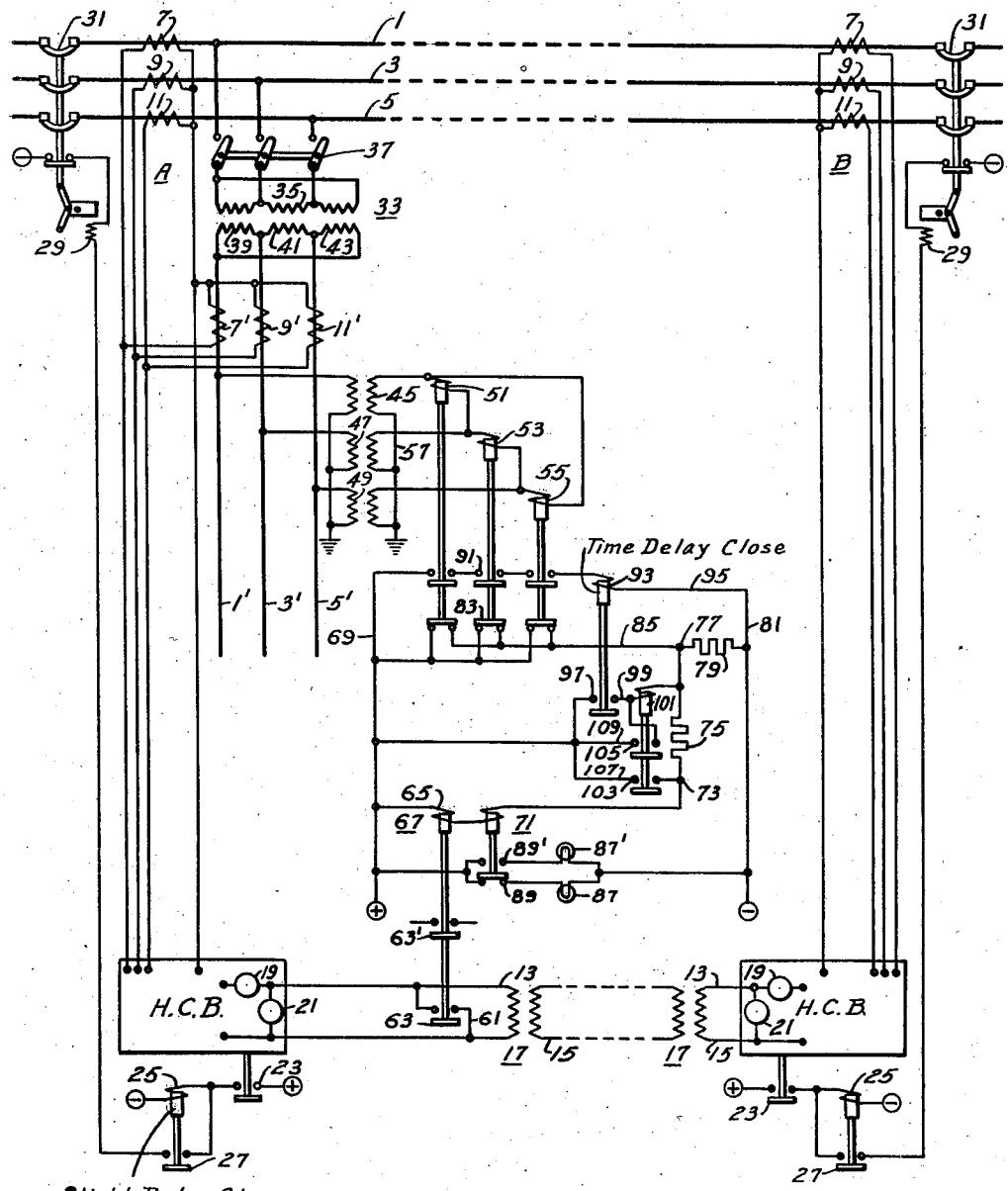

May 22, 1945. L. L. FOUNTAIN ET AL 2,376,767
DISCRIMINATING PROTECTIVE RELAYING APPARATUS
Filed March 31, 1942 2 Sheets-Sheet 2

WITNESSES:

INVENTORS
Lawrence L. Fountain and
Edward H. Klemmer.
BY
ATTORNEY

Patented May 22, 1945

2,376,767

UNITED STATES PATENT OFFICE 2,376,767

DISCRIMINATING PROTECTIVE RELAYING APPARATUS

Lawrence L. Fountain and Edward H. Klemmer, Wilkinsburg, Pa., assignors to Westinghouse Electric & Manufacturing Company, East Pittsburgh, Pa., a corporation of Pennsylvania Application March 31, 1942, Serial No. 437,008

3 Claims. (Cl. 175—294)

Our invention generally relates to protective relaying apparatus for protecting electrical equipment against damage of any kind by destructive or objectionable electrical conditions therein; but more particularly relates to differential protective relaying apparatus which is applied to electrical equipment for the purpose of protecting the electrical equipment against internal faults.

Patent No. 2,183,646 of December 19, 1939 to E. L. Harder, and Patent No. 2,205,206 of June 18, 1940 to E. H. Klemmer illustrate examples of differential protective relaying apparatus, functioning under internal fault conditions, which may be utilized in our invention, although such examples are not limitations of systems which may be used in our invention. Such relaying apparatus protects multi-phase electrical equipment against internal faults by causing a line- or circuit-interrupting operation which disconnects or deenergizes the protected electrical equipment upon the occurrence of a fault which is internal with respect to the protected electrical equipment.

For such protection, current-measuring devices are provided at two or more spaced measuring points or stations of the electrical equipment, including points or stations representing the ends of the protected part or section of the electrical equipment. Means are also provided for so relating and interconnecting the current-measuring devices that a measure of the current-flow to the protected electrical equipment is compared at every instant to a measure of the current-flow out of the electrical equipment. No circuit-interrupting operation for disconnecting or de-energizing the electrical equipment is caused when the in-flowing currents substantially balance the out-flowing currents, on the same base; such balance existing when the electrical equipment is operating normally under steady-state conditions, or when a fault occurs which is external to the protected electrical equipment. A circuit-interrupting operation, however, tends to occur when the in-flowing and out-flowing currents are not balanced, the amount of unbalance required to effect a circuit-interrupting operation depending on the sensitivity or adjustment of the protective relaying apparatus. The protective relaying apparatus is made to effect a circuit-interrupting operation in the event of an internal fault in the electrical equipment; but conditions simulating, in some respect, an internal fault-condition sometimes arise in protected electrical equipment which comprises an electrical device or devices requiring an exciting current through which energy is initially established therein. By exciting current we mean a current that flows into one side of an electrical device without producing a compensating current on another side which, although functionally associated therewith, is not directly conductively connected to the input side. The magnetizing current for a transformer is an example of an exciting current. A magnetizing current flows in the primary of the transformer but has no counterpart in the secondary of the transformer.

In this respect an exciting current simulates an internal fault, but under normal steady-state operating conditions of the electrical equipment is too small to initiate a circuit-interrupting operation by the protective apparatus. However, when the electrical equipment, or the electrical device thereof which requires an exciting current, is first energized, the transient inrush of exciting current may reach a magnitude several hundred, or more, times the normal operating magnitude of such current, and even several times the normal permissible load current in the electrical equipment, so that an excess current flows in the electrical equipment until the transient subsides to a suitable extent. Such a transient inrush of exciting current may cause the protective relaying apparatus to initiate an improper or false circuit-interruption.

It is an object of our invention to provide protecting relaying apparatus of the class described, with means which will prevent functioning of the protective relaying apparatus by excess currents in the protected electrical equipment, which result from normal operating-conditions thereof, but which, in some manner, simulate an internal fault-current condition therein.

It is an object of our invention to provide a system of the type described with means which will prevent false or undesirable circuit-interrupting operation when transient exciting currents exist in the electrical equipment of a magnitude simulating an internal fault-condition.

It is an object of our invention to provide a differential protective relaying apparatus with means for discriminating between electrical-conditions including excess-currents arising out of an internal fault and electrical-conditions including similar excess-currents arising from a normal operating-condition in the electrical equipment.

It is an additional object of our invention to provide a discriminating protective relaying system of a type described which will distinguish certain current-conditions arising because of internal faults from similar current-conditions arising from normal operation of an electrical equipment; but free to function at any instant in response to an internal fault.

It is another object of our invention to protect electrical equipment with a protective relaying apparatus which causes a line- or circuit-interrupting operation for disconnecting or deenergizing the electrical equipment in response to fault-current line-conditions, but which is provided with supervisory means that will not permit a circuit-interrupting operation when similar excess-current line-conditions temporarily exist, unless they are actually caused by internal faults in the electrical equipment. The supervisory means is so arranged that the tendency of the protective equipment to cause a circuit-interrupting operation in response to actual fault-current line-conditions predominates over the tendency of the supervisory means to prevent such operation.

A more particular object of our invention is to provide a protective pilot wire system extending between measuring stations of the protected electrical equipment, with supervisory means which will render the pilot wire system non-responsive to normal transient currents within the protected electrical equipment.

A specific object of our invention is to provide a short-circuiting device for the pilot wires of a pilot wire circulating-current differential protective relaying apparatus, which shorting-device will be under control of the line-conditions of the electrical equipment to the end that, when operative, the pilot wires are short-circuited only during objectionable transient-current conditions within the protected equipment. An ancillary object thereto is to render such a shorting-device inoperative should an internal fault occur in the meantime.

Figure 2:
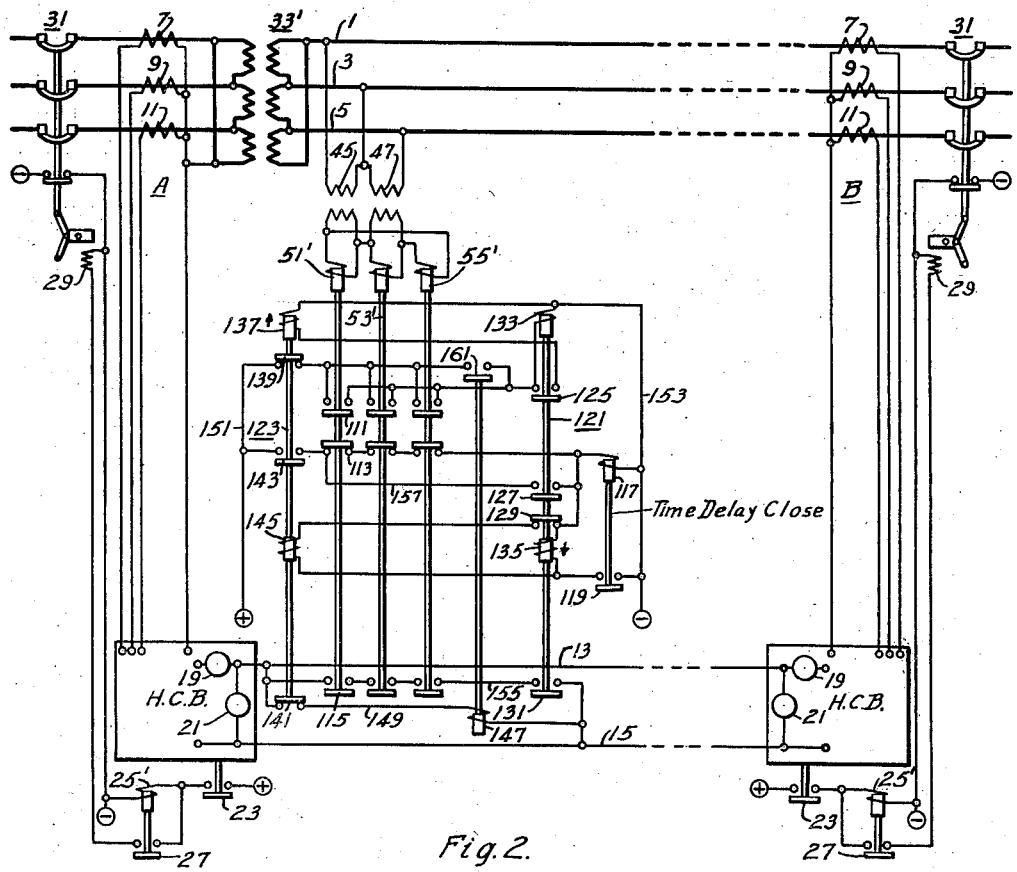
Figure 3:
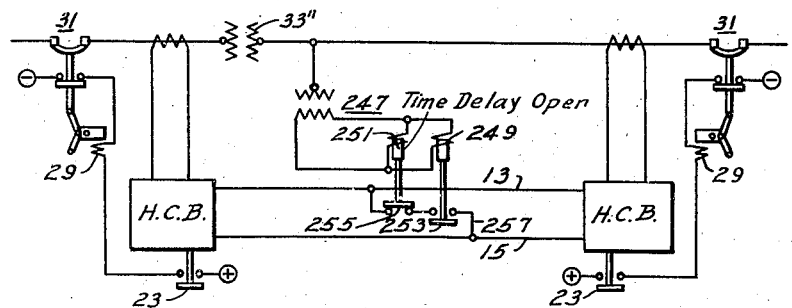

Other objects, features and innovations of our invention will be discernible from the following description thereof, which is to be taken in connection with the accompanying drawings. In these drawings, in which similar numerals refer to similar or equivalent parts:

Figures 1 and 2 are diagrammatic multi-phase wiring diagrams of two different embodiments of our invention; and Fig. 3 is a schematic diagram, having parts in single line form, of still another embodiment of our invention.

Referring more particularly to Figs. 1 and 2, the electrical equipment to be protected is shown as a three-phase transmission line comprising phase line-conductors 1, 3 and 5 which extend for some length. At suitably spaced places along these conductors, a plurality of current-measuring stations, including a pair of stations A and B, are provided; each station having means for obtaining a response or responses in the form of electrical quantities measurably representative of current-conditions in the line-conductors at the respective stations.

Preferably the responsive measuring means is responsive to the separate phase-currents in the transmission line, and may comprise current-transformers 7, 9 and 11 measurably responsive respectively to the phase-currents in each line-conductor 1, 3 and 5.

The corresponding individual line-current measuring electrical quantities derived from the current-transformers at each station may be respectively directly compared, as taught in the aforesaid Klemmer patent; but we prefer to combine the electrical line-current measuring quantities derived at each station into a single electrical relaying quantity for the station, which measurably represents the currents in the line-conductors thereat so that the electrical relaying quantity is responsive, in some manner or manners, to a combination of the separate electrical line-current measuring quantities, which combination may involve components of the line-currents. To this end, the measuring currents derived from the current transformers at each station are suitably combined thereat in a network equipment, designated as H. C. B. in the drawings, which combines the line-derived measuring currents into the single electrical relaying quantity which is representative of the line-current conditions at the station. A network of this kind is disclosed in the aforesaid Harder patent and in Fig. 2 of application Serial No. 338,093, of E. L. Harder, filed May 31, 1940, and assigned to the Westinghouse Electric & Manufacturing Company. This application has become Patent No. 2,296,784 of September 22, 1942. Other utilizable networks are generally known by means of which a single electrical relaying quantity representative of line-current conditions at a station can be derived.

For differential protection the electrical relaying quantities for the respective measuring stations are compared, in a suitable manner or manners, through intercommunication channels between the various networks at the stations. In the specific forms of our invention, such interconnecting means comprises pilot wires 13 and 15. If the electrical relaying quantities are alternating-current, as described in the aforesaid Harder patent, insulating transformers 17 can be provided for protecting the networks against excessive voltages extraneously induced in the pilot wires.

The pilot wires, which are part of the differential comparing means through which the electrical relaying quantities at the stations are compared, are connected to each H. C. B. network to provide a differential circulating-current protective system such as more particularly shown in Figs. 9 and 11 of the aforesaid Harder patent.

Each network comprises a restraining winding 19 in series circuit relation in the pilot wires, and an operating winding 21 shunted across the pilot wires. The operating and restraining windings 19 and 21 at a station control a set of normally-open contacts 23 in an energizing circuit for an operable relay 25 which, for a purpose of our invention, requires continuous energization for a short time interval before it closes its normally-open contacts 27, but opens these contacts immediately upon deenergization of the relay. When the relay 25 has been energized for the required time, it closes normally-open contacts 27 which complete an energizing circuit, including contacts 23 in closed position, to an operable tripping coil 29. When energized, the tripping coil 29 causes tripping of a circuit-breaker 31 at the associated station, thereby causing a circuit-interrupting operation on the line-conductors 1, 3 and 5 thereat.

Limited to the purpose of our invention, the operation of the system described is as follows: With balanced current flowing at the stations A and B, the electrical relaying circuits in the respective H. C. B. networks produce measuring relaying voltages which are so poled as to cause a circulating current to flow in the pilot wires without producing a potential for operating the operating windings 21; but when an internal fault of any kind occurs between the sets of current-measuring transformers, the voltages producing the circulating current are so affected as to cause a sufficient operating current to flow through one or more of the operating coils 21 to effect a closure of the associated contacts 23, thereby energizing the associated relay 25 which, if maintained energized for the required time, ultimately causes opening of the associated circuit-breaker 31.

Our invention is particularly applicable to an electrical transmission line system which includes a reactance device, such as a transformer, within the protected section, which has an exciting current of relatively great magnitude upon initial energization of the reactance device. In Fig. 1 such a device comprises a transformer bank 33 having three-phase primary windings 35 connected to the line-conductors 1, 3 and 5, through a disconnect switch 37. The transformer bank further comprises three-phase secondary windings 39, 41 and 43 connected to three-phase output line-conductors 1', 3' and 5' respectively, which may be considered to be part of or extensions of the line-conductors 1, 3 and 5.

The inclusion of the transformer bank 33 within the protected section makes it necessary to add another set of current-measuring current-transformers 7', 9' and 11', respectively, in the line-conductors 1', 3' and 5'; these current-transformers being individually suitably connected, properly poled, in parallel with the corresponding current-transformers 7, 9 and 11 at an associated station.

Initial energization of the transformer bank 33 is accompanied by a transient inrush of exciting current in the primary windings which is not reflected as current in the secondary windings. Since this exciting current is internal with respect to the sets of measuring transformers, the latter will indicate that the in-flowing currents to the protected electrical equipment between them and the outflowing current thereof, are not balanced; thereby simulating an internal fault-condition. Under certain circumstances this transient inrush of current may be, if the transformer bank is of suitable size, up to about five times normal load current, approximating in maximum magnitude internal fault-currents, and tending to initiate a false circuit-interrupting operation by the protective apparatus until the transient exciting current has tapered off to a safe value, a period which may require a few seconds.

To prevent false operation of the circuit-breaker when such exciting current exists, a supervisory system is provided, comprising potential-transformers 45, 47 and 49. The potential-transformers are each connected across a separate phase of the three-phase line-conductors 1', 3' and 5', and energize, respectively, relays 51, 53 and 55. The voltage across each relay 51, 53 or 55 is representative of that of the associated phase. Upon energization, relays 51, 53 and 55, connected in delta, immediately actuate sets of contacts, subsequently designated, which also actuate immediately upon deenergization of the relays. The supervisory system further comprises a controllable shorting-circuit 61 across the pilot wires 13 and 15, and means for controlling this shorting-circuit.

The shorting-circuit 61 includes normally open contacts 63 under control of a coil 65 of an instantaneously operating relay 67. The energizing circuit for the relay coil 65 extends from one conductor 69 of an energizing source of power, through the relay coil 65, a coil of a signal relay 71, a junction 73, a current-limiting resistor 75, a junction 77, a current-limiting resistor 79, to the opposite conductor 81 of the power source.

When the transformer bank 33 is deenergized, the relays 51, 53 and 55 are deenergized, and their respective sets of back contacts 83 are closed in parallel between the power conductor 69 and junction 77. In closed position, each set of contacts 83 completes a shorting-circuit 85 which prevents energization of the coils of the relays 67 and 71. Accordingly, the shorting-circuit 61 across the pilot wires remains open, and the circulating current in the pilot wires is not disturbed by it. This condition may be indicated by energization of a signal 87 through the closed back contacts 89 of the deenergized signal relay 71.

When the transformer bank 33 is initially energized an exciting current will be established, which may be assumed to be initially of such magnitude as to simulate an internal fault-current. Consequently, the circulating current in the pilot wires will be so affected as to cause a current to flow in an operating coil 21, closing its contacts 23 and thereby energizing the associated relay 25. However, this relay has been deliberately made slow acting, say about two or three cycles, so that it does not immediately close its contacts 27 for completing the circuit to the tripping means 29. However, as soon as the exciting current flows, voltages are established across the conductors 1', 3' and 5' energizing the relays 51, 53 and 55 which immediately separate the respective sets of contacts 83, thereby opening the shorting-circuit 85 for the relay coil 65 and relay 71.

The relay coil 65 is immediately energized, immediately closing its contacts 63 which complete the shorting-circuit 61 across the pilot wires, thereby shorting all operating coils 21 in the protective relaying system, and preventing their energization. Such shorting operation obviously causes the operating coils to open their contacts 23, thereby deenergizing time delay relays 25 before they have had time to actuate their contacts 27. The relay 71 is also immediately energized, closing its front contacts 89'. The signal 87 is, consequently, deenergized and a signal 87' energized.

After the initial inrush of exciting current to the transformer bank has subsided to a substantial extent, it is desirable to open the shorting-circuit across the pilot wires so that the protective relaying apparatus can function in response to subsequent line-conditions. To this end the relays 51, 53 and 55 are provided with sets of front contacts 91 in series circuit relation with a time delay relay 93 in a circuit 95 across power conductors 69 and 81. When all of the relays 51, 53 and 55 are energized, indicating proper operating conditions for the transformer bank 33, the circuit 85 is opened and the circuit 95 is closed so that the time delay relay 93 is energized. After a predetermined time which is somewhat greater than the time required for the transient exciting current to subside or decrease to a value which will not cause a false operation of the protective relaying apparatus, front contacts 97 of the time delay relay 93 are closed and complete a circuit 99 from the conductor 69, through an instantaneously operating relay 101 connected to the junction 77. Energization of relay 101 causes it to immediately actuate its normally-open sets of contacts 103 and 105. Closed contacts 103 complete another shorting-circuit 107, extending from the power conductor 69 to the junction 73, which provides an alternate shorting-path preventing continued energization of the relays 67 and 71. These relays therefore become deenergized, permitting actuation of their sets of contacts 63 and 89, the former opening the shorting-circuit 61 on the pilot wires and the latter causing an indication of this condition. Closed contacts 105 complete a holding circuit 109 from the conductor 69 to relay 101, assuring that the shorting-circuit 107, through contacts 103, for the relay 67 will be maintained.

From the foregoing it is evident that the shorting-circuit 61, which renders the protective relaying apparatus non-responsive to the transient exciting current, is kept closed until the time delay relay 93 closes its contacts 97, by which time the exciting current will have sufficiently subsided. Should, however, an internal fault occur while an excessive transient exciting current is flowing, one or more of the relays 51, 53 and 55 will become deenergized, instantly closing the shorting-circuit 85 through a set of contacts 83. The completed shorting-circuit 85 deenergizes the relay 67 which had been energized because all sets of contacts 83 were, prior to the fault, in open position, and because the time delay relay 93 had not yet closed its contacts 97. Deenergized relay 67 opens its contacts 63, and the pilot-wire system is restored to a condition for detecting unbalanced in-going and out-going currents of the protected equipment.

If the transformer bank should be closed upon an internal fault then one or more of the relays 51, 53 or 55 will not be initially energized so that the shorting-circuit 85 is not initially opened, and the relay 67 remains deenergized, so that the control of the relays 21 by pilot wire circulating current is not affected.

Should an internal fault occur after the transient exciting current has subsided, one or more of the relays 51, 53 and 55 will become deenergized, thereby closing one or more sets of contacts 83 which complete the shorting-circuit 85 for shorting in effect, both relays 101 and 67. The contacts 103 of the former open and interrupt the shorting-circuit 107 about the relay 67, but this has no effect because the shorting-circuit 85 for the relay 67 has been established, so that the protective relaying apparatus, which already was in condition to respond to the internal fault, is not disturbed by the supervisory means, and responds to the internal fault.

During severe external faults, the voltage across one or more relays 51, 53 or 55 may be temporarily lowered sufficiently for deenergization thereof, thereby closing one or more sets of contacts 83 and opening the associated contacts 91. Closing such contacts 83 shorts the relays 101 and 67, but because the fault is external there is no tendency for the H. C. B. networks to cause a circuit-interrupting action. Opening such contacts 91 deenergizes relay 93 which immediately opens its contacts 97 and resets for subsequent time delayed closing. Consequently, the supervisory system is placed in condition to prevent a circuit-interrupting action due to an inrush of exciting current when the system voltage is suddenly restored upon the clearance of such external fault.

When the transformer bank is deenergized, the shorting-circuit 85 is completed by deenergization of relays 51, 52 and 53, so that the relays 101 and 67 are deenergized, and the pilot wire system operates normally.

Deenergization of a relay 51, 52 or 53 also interrupts the energizing circuit for the time delay relay 93 which instantly opens its contacts 97, restoring the supervisory system to its stand-by condition.

The system of Fig. 1 requires a slight delay, generally not more than two or three cycles however, between the actuation of an operating coil 21 and its associated tripping coil 29 in order to permit the supervisory means to discriminate between an excess transient exciting current and an internal fault-current condition, this discrimination being reflected in the condition of the contacts 63. However, in the system shown in Fig. 2, the pilot wires are normally shorted when the electrical equipment is deenergized and the protective relaying apparatus is immediately responsive to a fault condition without time delay.

Referring to Fig. 2 the transformer bank 33' is shown, in this case, directly in the line-conductors 1, 3 and 5. The potential responsive relays 51', 53' and 55' are provided with three sets of contacts 111, 113 and 115, the first set being in parallel relation and the last two sets in series relation.

Additional relays are provided in the supervisory means comprising a time delay relay 117 having a set of contacts 119, an instantly-operating two-position relay 121 and an instantly operating two-position relay 123. The two-position relays 121 and 123 are of a common type which is provided with a coil to operate the contacts of the relay to one position, where the contacts remain until another coil of the relay is energized to move them to their other extreme position where they again remain until restored to their first position by energizing of the first coil. The contacts remain in whatever position they are last moved even if the last energized coil is deenergized.

The relay 121 comprises a plurality of sets of contacts 125, 127, 129 and 131 actuated respectively to closed, closed, open and closed positions by energization of a coil 133 and to open, open, closed and open positions by energization by a coil 135. Similarly the relay 123 has an actuating coil 137 for placing sets of contacts 139 and 141 in the open position and contacts 143 in the closed position; and a second actuating coil 145 for placing the sets of contacts 139 and 141 in the closed position and the contacts 143 in the open position. A current relay coil 147 and the contacts 141 are in series across the pilot wires, resulting in a shorting-circuit 149 across the pilot wires 13 and 15, so that the operating coils 21 of the various H. C. B. networks can be shorted.

Upon energization of the transmission line-conductors 1, 3 and 5, the coil 133 is energized through a circuit including power lead 151, normally closed contacts 139, one or more sets of contacts 111 which are closed by energization of potential responsive relays 51', 53' and 55', the coil 133 and power lead 153. The coil 133 actuates the various sets of contacts 125, 127, 129 and 131. The contacts 125 close a branch circuit which energizes the operating coil 137 of the relay 123. The contacts 131 close a second shorting-circuit 155 across the pilot wires 13 and 15 which is completed because the energization of the relays 51', 53' and 55' have closed the sets of contacts 115.

Energization of coil 137, through closing of the contacts 125, causes contacts 139 to open the energizing circuit for the coils 133 and 137; and causes contacts 143 to prepare a circuit from power lead 151 through contacts 143, conductor 157, now closed contacts 127, to time delay relay 117 and operating coil 135 in parallel, the former only being energized because it is directly connected to the power lead 153; and causes contacts 141 to open the shorting-circuit 149. After a time delay, adjusted to the time required for the transient exciting current to properly subside, the relay 117 closes its contacts 119 for completing the circuit to the coil 135 which therefore actuates the sets of contacts 125, 127, 129 and 131 to the positions shown.

Actuation of contacts 125 by energization of the coil 135 restores them to normally open position, interrupting the circuit to the coil 137. Actuation of the contacts 127 by energization of the coil 135 opens the circuit to the time delay relay 117 which immediately releases its contacts 119 so that they move to open position. The opening of contacts 127 also interrupts the circuit to the coil 135. Actuation of contacts 129 to closed position by the coil 135 prepares a circuit to coil 145 of the relay 123, which circuit, however, is interrupted at the opened contacts 127 and also by contacts 119 in opened position.

The pilot-wire shorting-circuit 149 is open because contacts 141 are in the open position due to actuation of the coil 137; and the second shorting-circuit 155 is open because contacts 131 are in open position due to actuation of the coil 135. This allows the pilot wires to function in the normal manner.

During normal energization of the transmission line, including the transformer 33', the supervisory apparatus remains with all its relay coils, except the relay coils 51', 53' and 55', deenergized. The relays 121 and 123 have been last actuated by their operating coils 135 and 137, respectively.

If an internal fault should now occur on the transmission line the protective relaying apparatus is immediately responsive thereto.

When the transmission line is next deenergized the relays 51', 53' and 55' become deenergized permitting the sets of contacts 113 to close a circuit from power lead 151, closed contacts 143, the contacts 113, and time delay relay 117. When the relay 117 actuates its contacts 119 a circuit is completed to the operating coil 145 through the closed contacts 129, restoring the relay 123 to its initial position. Inasmuch as energization of a coil 135 has restored the relay 121 to its initial position, the supervisory means is ready to function when the transmission line is again energized.

Should the transmission line be closed upon an internal fault or should such a fault occur while the shorting-circuits 149 and 155 are closed, voltage for energizing one or more of the relays 51', 53' and 55' will be lacking and one or more sets of contacts 115 will remain unactuated or be opened so that the circuit 155 is interrupted. The circulating current in the current relay coil 147 of the shorting-circuit 149 will complete a circuit through its contacts 161 to the operating coil 133 of relay 121, which immediately completes a circuit through the operating coil 137 of relay 123, thereby opening the shorting-circuit 149 at the contacts 141 so that the protective relaying apparatus is responsive to internal fault currents. It is not necessary to provide a time delay on the relays 25', which energize the tripping coil means for the circuit breakers of Fig. 2.

In Fig. 3 a further modified form of our invention is shown for a system in which a slight delay is permissible between the occurrence of an internal fault and the operation of the circuit breaker trip coils by the H. C. B. relay contacts 23. In this figure, which is simplified and shown mostly in single line form, the potential transformer 247 energizes an instantaneously acting relay 249 and a time delay-in-operating relay 251. The relays 249 and 251 have, respectively, normally opened contacts 253 and normally closed contacts 255 in series relation in a shorting-circuit 257 across the pilot wires 13 and 15. When the transformer bank 33'' is initially energized, the voltage produced in the potential transformer 247 energizes the relays 249 and 251, the relay 249 closing the shorting-circuit 257. The shorting-circuit is maintained closed until the relay 251 has been energized for a time sufficient to cause it to open its contacts 255, whereupon the shorting-circuit is opened, restoring the protective relaying apparatus to normal protecting condition.

The time-adjustment for opening the contacts of relay 251 depends, as in the eembodiment of Fig. 1, upon the expected time for the exciting current to subside to a value which will not affect the protective relaying apparatus. If an internal fault should occur while both sets of contacts 253 and 255 are closed, that is, the exciting current as not yet sufficiently subsided, the relay 249 becomes deenergized, immediately restoring the protective relaying apparatus to its protective function.

With three-phase equipment the individual relays 249 and 251 for each phase would have their sets of contacts in series in the shorting-circuit 257.

While we have described our invention in forms which we now prefer, it is obvious that many modifications may be made thereto and equivalent systems provided. For example, in pilot wire systems using responsive voltages at the measuring stations which oppose each other, the pilot wire circuit may be opened instead of shorted. Also, an additional system or systems can be controlled by an additional contact or contacts 63' controlled by the relay 67.

We claim as our invention:

1. A protective system for alternating-current electrical equipment having transmission line means including a plurality of separated stations where current may enter or may leave; responsive means at each station for deriving electrical quantities representative of the line-currents at the corresponding station, said responsive means including means for combining said derived electrical quantities at each of several stations in a predetermined manner or manners; protective means having the property of comparing the combined electrical quantities, said protective means including operable means for initiating a protecting operation and controlling means for said operable means for operating said operable means in response to a fault-current condition internal to said electrical equipment; and supervisory means including stopping means for rendering said operable means insensitive to control by said controlling means, in response to an internal excess-current condition which simulates said internal fault-current condition in its effect on said protective means, when an adequate voltage exists, at the time, for suitable energization of said electrical equipment, said supervisory means including means substantially instantaneously responsive to a fault voltage-condition in said electrical equipment for rendering said stopping means ineffective on said operable means and restoring said operable means to control by said controlling means.

2. An electrical system of the class described, comprising multi-phase transmission line means and protective means therefor, said transmission line means comprising a pair of spaced stations and a multi-phase transformer means connected to said transmission line means between said pair of stations, said transformer means being such that it may take a transient exciting current of a magnitude characteristic of an internal fault in said transmission lines, said protective means comprising network means at one of said stations for obtaining a single electrical quantity representative of line current-conditions in said transmission line-means thereat, network means at another of said stations for obtaining a single electrical quantity representative of line current-conditions to be compared to the first said line current conditions, a plurality of line-interrupting means, operable tripping means for said line-interrupting means, means comprising pilot wires interconnecting both said network means, each of said network means having means for causing said electrical quantities to produce a circulating current in said pilot wires, representative of current conditions in said transmission line means, and having a plurality of operating devices, each being separately associated with one of said line-interrupting means, and each being connected across said pilot wires for operating only the associated one of said line-interrupting means when said circulating current is representative of an internal fault in said transmission line means, and a single shunting means across said pilot wires, said shunting means comprising a shunting circuit having circuit-interrupting means therein, said circuit-interrupting means being normally open during energization of said transmission line, and means for closing said circuit-interrupting means for shorting said operating devices when said transformer means is taking an exciting current as aforesaid.

3. The invention of claim 2 characterized by a means responsive to voltage in said transmission line for controlling said shunting means.

LAWRENCE L. FOUNTAIN.
EDWARD H. KLEMMER.